Figure 1:
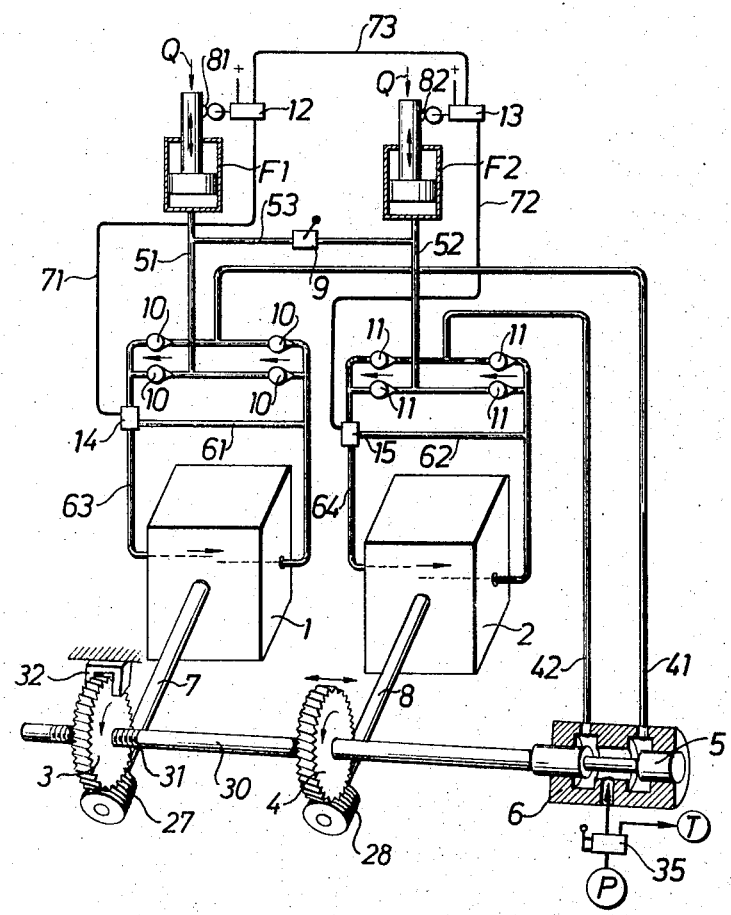

United States Patent [19]
Joelson

[11] 3,850,081
[45] Nov. 26, 1974

[54] DEVICE FOR DIVIDING A FLUID FLOW INTO PREDETERMINED PROPORTIONS

[75] Inventor: Karl Evert Anders Joelson, Lenhovda, Sweden

[73] Assignee: AB Vabyma, Molndal, Sweden

[22] Filed: Apr. 11, 1972

[21] Appl. No.: 242,966

[52] U.S. Cl................. 91/413, 91/171, 91/189
[51] Int. Cl................. F01b 25/04, F15b 11/22
[58] Field of Search............... 91/171, 413; 60/97 E

[56] References Cited
UNITED STATES PATENTS

| | | | |
|---|---|---|---|
| 2,380,973 | 8/1945 | Kopp | 91/171 |
| 3,033,219 | 5/1962 | Erle | 91/171 |
| 3,106,872 | 10/1963 | Hegg et al. | 91/171 |
| 3,296,936 | 1/1967 | Wess et al. | 60/97 E |

*Primary Examiner*—Paul E. Maslousky
*Attorney, Agent, or Firm*—Stevens, Davis, Miller & Mosher

[57] ABSTRACT

A device for dividing a fluid flow in a predetermined proportion between two consumers thereof. First and second displacement type flow gauges are in the flow paths between the fluid source and the consumers. The gauges drive a comparator means to regulate the flow amounts to or from the consumers. The comparator has a shaft mounted to move axially to actuate a slide valve when the gauges are not operating with the same flow.

2 Claims, 2 Drawing Figures

DEVICE FOR DIVIDING A FLUID FLOW INTO PREDETERMINED PROPORTIONS

In the field of hydraulics it is often desired to divide fluid flows into predetermined proportions, e.g. in order to synchronize the movement of two or more hydraulic motors. The case may be, for instance an application in which two or more hydraulic motors of the cylinder type are arranged to act on a part with large dimensions of a tool or a machine, the correct functioning of said part requiring an exact, predetermined movement of all of its portions. Such a case is present in certain edging presses with a press tool arranged to be acted upon by two or more cylinders. In such an arrangement it is of importance that the movement of the press tool is always such that the tool does not meet the die in an oblique position.

For this and other applications one has hitherto used, besides purely mechanical parallel guiding means which must be dimensioned to stand considerable forces and therefore are bulky and expensive, means for flow control or flow division based on the principle that the liquid flow to each working cylinder is brought to flow through a throttling, control means being provided which operates in dependence of the pressure drop over the throttling, which pressure drop is representative of the amount of liquid per unit time flowing through the throttling, and which controls by means of a valve the through-flowing amount of liquid so that the latter is approximately equal to a prescribed value. However, the tolerance or error in the arrangement amounts to at least 5 percent of the desired value owing to the fact that the total amount of liquid is not kept constant, that changes of the viscosity of the liquid occur as well as varying liquid friction etcetera. In another known system two hydraulic pump-motor units have been used for the accurate control of two consumers, the shafts of said units being coupled to each other. The two units are coupled in parallel and connected to the main pump, each of the two consumers being connected in series with one of said units. As the two units are coupled to each other and therefore rotate with the same speed of rotation an equal volume of liquid per unit time would theoretically flow through both units and full synchronization would be attained. However, if the consumers, e.g. hydraulic cylinders, meet mutually different resistance the unit working against the lower resistance will function as a motor and will drive the unit meeting the higher resistance, the latter motor then operating as a pump. Since because of internal leakage the unit working as a motor will pass a lesser liquid volume than the theoretical value the synchronization will not be exact. The error in each unit easily amounts to about 5 percent at a pressure difference of for instance 80 kg/cm$^2$, the total error thus amounting to about 10 percent. This error is unacceptable in most cases.

The object of the present invention is to provide a device for dividing a liquid flow in predetermined proportions the division being effected with substantially greater accuracy than in known devices for similar purposes.

A device according to the invention for the division of a liquid flow to or from a first and a second consumer into a predetermined proportion between the consumers is characterized by a flow value gauge of the displacement type connected between each of the consumers and a flow generator or -receiver comparator means driven by both flow value gauges with low driving effect and arranged to detect the difference between the flow values obtained from the flow value gauges and valve means controlled by the comparator means and arranged to regulate the flow amounts to or from the consumers for maintaining said predetermined flow proportion between the consumers.

The flow value gauges suitably consist of hydraulic rotational motors. Each of the rotor shafts of the latter can be coupled by means of a worm drive to a worm wheel on a shaft, one of the worm wheels being secured to the latter shaft while the other worm wheel being in engagement with a thread on the shaft, the valve means being arranged to be controlled by the shaft or by the latter worm wheel.

In order to make it possible that the device can operate not only when flow passes through the consumers but also when flow passes from the consumers a valve system can, according to the invention, be coupled between the consumer and the pertaining flow value gauge, said valve system being arranged in a manner such that liquid flow passing to and from the consumer flows through the flow value gauge in one and the same direction.

The invention also proposes a setting system arranged to set the working positions of the consumers in the correct position at each full working cycle. The setting system may comprise means for sensing the working position of each consumer, a conduit connected in parallel to each flow value gauge and a flow switch coupled between the latter conduit and the input or output conduit of the flow value gauge, said flow switch being controlled by said position sensing means in such a manner that the liquid flow to or from the consumer is shunted to by-pass the pertaining flow value gauge if the corresponding consumer has not reached the position in which it can be sensed by the corresponding position sensing means before the other consumer has reached the position in which it can be sensed by its pertaining position sensing means.

In a modification of the device according to the invention one of the flow value gauges can be substituted by a motor of another type, for instance an electrical motor, said motor together with the other flow value gauge being connected to said comparator means in the aforesaid manner.

Figure 2:
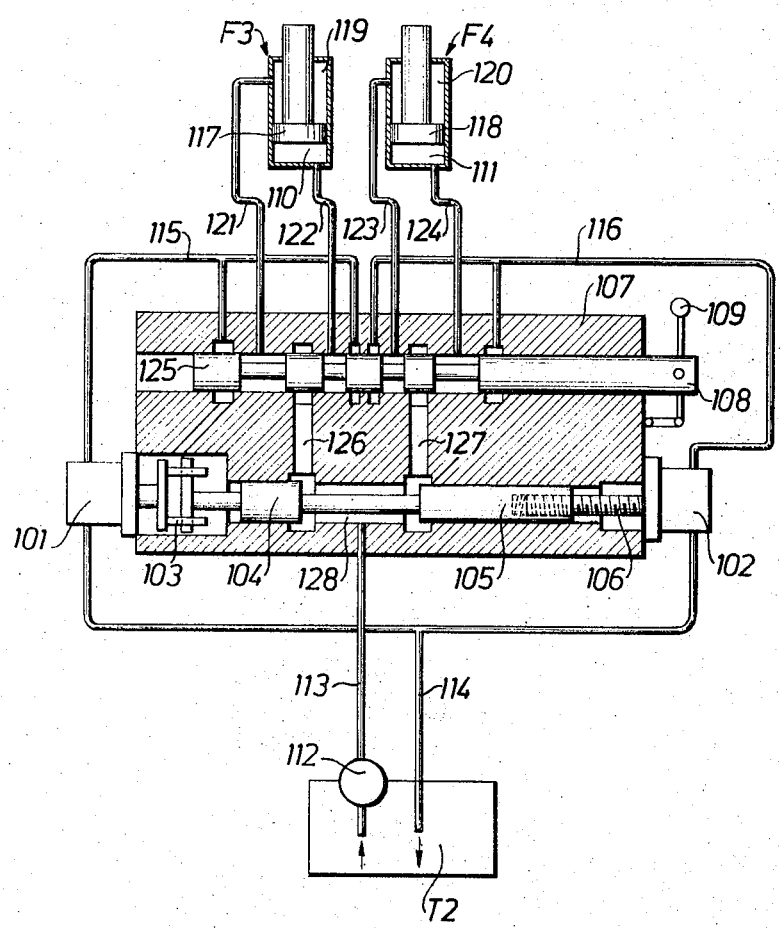

The invention will hereinbelow be more fully described with reference to the accompanying drawings on which FIG. 1 shows, schematically, a first embodiment of the invention and FIG. 2 shows a second embodiment.

The embodiment shown in FIG. 1 comprises two flow value gauges 1 and 2 through which liquid flow passes between a flow generator or pump P or a flow receiver for tank T on the one side and two consumers F1 and F2, represented by hydraulic cylinders, on the other side.

The flow value gauges 1 and 2 suitably consist of hydraulic rotational motors of the displacement type. The output shafts 7 and 8 of the motors are coupled to corresponding worm wheels 3 and 4 respectively on a shaft 30 by means of worm drives 27 and 28 respectively, the worm wheel 4 being fixed to the shaft while the worm wheel 3 engages by means of an internal thread with an external thread 31 on the shaft 30, the worm wheel 3 being held against displacement in the axial direction of the shaft 30 by means of a member 32. The shaft 30 is coupled to the slide 5 in a flow valve 6 the latter having a central conduit connection to the flow generator P and the flow receiver T respectively and two connections for output conduits 41 and 42 for liquid flow to and from the corresponding consumers F1 and F2.

A system of non-return valves 10 and 11 is connected between the conduits 51 and 52 to the consumers F1 and F2 respectively and the conduits 41 and 42 respectively and in parallel over the corresponding flow value gauges 1 and 2 respectively, all of said valves being conducting in the same direction marked by the arrows in the Figure. Each of the systems contains 4 non-return valves, viz. two series connections of two non-return valves, said series connections being connected in parallel to one another, the pipes 41 and 42 from the valve 6 being connected between the non-return valves of the one series connection and the pipes 51 and 52 to the consumers F1 and F2 being connected between the non-return valves in the other series connection.

A pipe 53 is coupled between the pipes 51 and 52 and is provided with a valve 9 which may be operable manually, said valve being provided to clear the pipe 53 for zero-adjustment of the consumers F1 and F2.

A pipe 61 and 62 respectively is coupled in parallel with each of the flow value gauges 1 and 2, a flow switch 14 and 15 respectively being coupled to the point of connection between this shunt pipe 61 and 62 respectively and one of the supply pipes 63 and 64 respectively to the flow value gauges, said flow switch being capable of occupying two positions. In one of said positions the flow switch permits passage of liquid from the system of non-return valves 10 and 11 respectively, to the flow value gauges 1 and 2 respectively via pipes 63 and 64 respectively while the shunt pipes 61 and 62 respectively are closed. In the other position the switches permit passage of liquid from said system of non-return valves 10 and 11 respectively to and through the shunt pipes 61 and 62 respectively while the pipes 63 and 64 respectively are closed. The switches 14 and 15 are controlled, suitably by electrical means, by members 12 and 13 respectively for sensing a predetermined position, suitably the end position, of the consumers F1 and F2 respectively. The system comprising the flow switches 14 and 15 and the position sensing members 12 and 13 are adapted for setting or correcting the consumers F1 and F2 in the following manner. The position sensing member 12 is connected to the switch 14 by means of the electric conductor 71 and the position sensing member 13 is connected to the switch 15 by means of the conductor 72, the sensing members being interconnected by means of the conductor 73. The sensing members are actuated by cams 81 and 82 respectively of the consumers F1 and F2, the latter being shown as hydraulic cylinders. The sensing members are of a construction known per se and are so arranged that, if none of them is actuated or if both of them are actuated simultaneously by the cams 81 and 82 respectively, the corresponding flow switches 14 and 15 respectively are set in their first switching position, the normal position, while, if only one of the sensing members is actuated, adjustment or correction takes place in the manner described below.

The shown device operates in the following manner. In the shown intermediate position of the slide 5 of the valve 6 liquid passes from the pump P via the pipes 41 and 42 and the conducting non-return valves 10 and 11 respectively to and through the flow value gauges 1 and 2 respectively and further through the conducting non-return valves 10 and 11 respectively and the pipe 51 and 52 respectively to the consumers F1 and F2, and as this takes place the latter perform a working stroke against the action of the loads Q. The flow value gauges 1 and 2 thereby rotate with the same speed and the comparing device comprising the worm drives 27, 28 the worm wheels 3, 4 and the shaft 30 with the thread 31 which comparing device is adapted to compare the speeds of the flow value gauges does not effect any movement of the valve slide 5 which therefore merely rotates. This condition prevails as long as none of the consumers is required to overcome a greater load than the other consumer.

However, should the load on one of the consumers become greater than the load on the other consumer this will be indicated by a decreased speed of rotation of the corresponding flow value gauge. Thereby a difference in speed between the worm wheels 3 and 4 occurs so that the shaft 30 is displaced in its direction of length in such manner that the connection between the pump and the pipe 41 or 42 feeding the consumer with the lower proportionate load is throttled while the connection to the pipe feeding the consumer with the higher proportionate load is kept open. By throttling the liquid supply the flow value gauge corresponding to the consumer with the lesser load will decrease its speed of rotation so that the movement of the slide 5 is stopped in a position in which both consumers receive an amount of liquid corresponding to what is required in order that the two consumers shall operate again with the desired working speed.

It is evident that, since the comparator device consisting of the two worm gears and the shaft and the slide 5 of the valve 6 only requires a very low energy or effect to perform its function, the pressure over the hydraulic motors 1 and 2 required for the regulation is very small, and this again means that there will be no liquid leakage in the motors worth mentioning and harmful for the accuracy of the regulation. By correct manufacture of the regulating device the regulating error can be reduced to one or two percent or less.

The above described regulation at the movement outwardly of the working cylinders F1 and F2 against the loads Q has an analogous counterpart at the movement inwardly of the working cylinders tanks to the arrangement of the systems including non-return valves 10 and 11 by means of which all liquid passage between the pump P or the tank T and the consumers F1 and F2 will always pass through the motors 1 and 2 in one and the same direction.

The above described system including the position sensing members 12 and 13 and the flow switches 14 and 15 has for its purpose to adjust or set the working cylinders into their correct positions after accumulated small inaccuracies in the regulation have taken place. As mentioned above the switches 14 and 15 are in a normal position in which they admit passage through the motors 1 and 2 of liquid flow between the pump P and the tank T respectively and the working cylinders if the position sensing members 12 and 13 are simultaneously actuated or non-actuated by the corresponding cams of the working cylinders. However, if one of the consumers has reached its position for actuating the corresponding position sensing means before the other consumer has reached the corresponding position, such a switching in the sensing members takes place that the switch corresponding to the last-mentioned consumer, but not the other switch, is switched into its second position whereby the full liquid flow from the pump P passes directly to this consumer via the conducting non-return valves of the corresponding non-return valve system and the corresponding shunt pipe 61 or 62, i.e., without passing through the corresponding flow value gauge the supply pipe 63 or 64 of which is now shut off by the switch. By this action the flow value gauge is stopped and by this functioning of the comparing means and the valve 6 described above also the other flow value gauge is stopped so that its corresponding consumer does not receive additional liquid flow before the other consumer has reached the position for actuating its corresponding position sensing means. When this has occurred the actuated switch is reversed to its normal position. Thus, the working cylinders have been set into their correct positions.

The above described functions of the adjustment system at the movement of the consumers outwardly against the loads has an analogous counterpart at the movement of the consumers inwardly thanks to the arrangement of the systems comprising non-return valves 10 and 11 respectively.

FIG. 2 shows another embodiment of the device according to the invention. The device comprises two flow value gauges 101 and 102 through which liquid flows between the pipe 114 and the pipes 115 and 116 respectively of which the pipe 114 is connected to the tank T2 and the pipes 115 and 116 are connected to 4 ring-shaped grooves enclosing a multi-valve stem 108 and arranged in a valve housing in a block 107 in which the multi-valve stem or slide 108 is arranged. The slide valve is arranged to be shifted axially by means of a lever 109 acting on the end portion of the valve slide 108. The flow value gauge 101 is connected by means of a coupling 103 to the adjacent end 104 of a valve shaft 105. The coupling 103 is adapted to admit mutual axial movement between the gauge 101 and the valve shaft. The valve housing around the valve shaft 105 is formed by the block 107 and has an internal valve space 128. The shaft 106 of the flow value gauge 102 is provided with an outer thread engaging an internal thread of a central axial bore in the adjacent outer end of the valve shaft 105. It is evident that the entire valve shaft will rotate but not move in axial direction when the gauges 101 and 102 rotate in the same sense and with the same speed of rotation but will be displaced in its axial direction when a difference occurs between the speeds of rotation of the two gauges 101 and 102.

At the top of FIG. 2 two double-action hydraulic motors F3 and F4 of cylinder type are shown, each of which comprising a working piston 117 and 118 respectively, a lower cylinder space 110 and 111 respectively below the pistons and an upper cylinder space 119 and 120 respectively above the pistons. From each of the cylinder spaces 110, 111, 119 and 120 a pipe 122, 124, 121 and 123 respectively passes to a corresponding ring-shaped groove around the axis of the valve stem 108.

Each of two pipes 126 and 127 connects the valve space 128 with a ring-shaped groove in the valve housing enclosing the valve stem 108.

Liquid from the tank T2 is pumped to the valve space 128 by means of a pump 112 via the pipe 113.

In FIG. 2 the valve shaft 105 and the valve stem 108 are shown in their neutral positions. Movement of the shaft 105 to the right leads to a throttling of the flow through the pipe 126 and movement to the left leads to throttling of the flow through the pipe 127.

Movement of the valve stem 108 to the left has two effects. Firstly, the cylinder spaces 110 and 111 of the motors F3 and F4 respectively are supplied with pressure fluid via the pipes 122, 126, 113 and 124, 127, 113 respectively so that the working pistons simultaneously perform a desired working stroke. Secondly, the cylinder spaces 119 and 120 are brought into communication with the tank T2 via the pipes 121, 115, 114 and the flow value gauge 101 and, respectively, via the pipes 123, 116, 114 and the flow value gauge 102. When hydraulic fluid flows from the cylinder spaces 119 and 120 at the movement upwards of the working pistons this fluid flows through the flow value gauges 101 and 102 respectively. If the pistons meet mutually different resistances so that they have a tendency to move by mutually unequal amounts one of the gauges will rotate with a higher or a lower speed than the other gauge. Thereby the shaft 105 will be displaced in the one or the other direction by such an amount that the fluid flow to the working cylinder which has been displaced more than the other cylinder is throttled sufficiently for reestablishing the desired displacement relation between the pistons which in the shown example means that the pistons shall always be displaced synchronously and by mutually equal amounts.

When the valve stem 108 is displaced to the right according to FIG. 2 the cylinder spaces 119 and 120 will be set under working pressure while the cylinder spaces 110 and 111 are evacuated to the tank T2 via the flow value gauges 101 and 102 respectively in an analogous manner as according to the above.

Owing to the fact that the hydraulic flow value gauges 101 and 102 in the embodiment according to FIG. 2 will always be inserted between the tank T2 and the flow pressure side of the working cylinders, and since the fluid pressure in this system is thus very low as compared with the pressure of the fluid on the high pressure side of the cylinders, an increase of the accuracy of the regulation is obtained inter alia as a consequence of the absence of the expansions and contractions of the pipe systems and other components caused by large pressure variations. Also the sealing problems in the flow value gauges and in the remaining part of the low pressure system will be decreased.

The shown embodiments can be modified in various manner within the scope of the invention. Thus, instead of one of the flow value gauges or motors of displacement type an electrical motor or other driving means can be used by which a predetermined amount of liquid can be divided into proportions, for instance for determining the speed of a working cylinder for matching with an automatic process. The flow value gauges may have mutually different capacity so that a certain amount of fluid can be divided into unequal proportions. In this case working cylinders with different stroke or different piston diameter can be controlled with high accuracy in a predetermined manner. The shown comparator devices can be substituted by other differential devices known per se.

I claim:

1. A device for driving a liquid flow to and from first and second consumers in a predetermined proportion between the consumers, comprising: first and second flow value gauges comprising hydraulic rotation motors, connected between one of said consumers and a flow generator, comparator means driven with low energy consumption by said flow value gauges for sensing the difference between the flow values obtained from the flow value gauges, and valve means controlled by said comparator means for regulating the flow amounts to and from the consumers for maintaining said predetermined flow proportion between the consumers, characterized in that each of the flow value gauges has a rotary output shaft which is coupled by means of a worm drive to a worm wheel on another shaft, one of said worm wheels being fixed to said other shaft while the other worm wheel is in engagement with a thread on said other shaft, said valve means being controlled by said other shaft.

2. A device according to claim 1 having a valve system connected between each of the consumers and the corresponding flow value gauge and adapted to provide that liquid flow passing to and from the consumers passes through the corresponding flow value gauges in one and the same direction.

* * * * *

UNITED STATES PATENT OFFICE
CERTIFICATE OF CORRECTION

Patent No. 3,850,081          Dated November 26, 1974

Inventor(s) Karl E. A. JOELSON

It is certified that error appears in the above-identified patent and that said Letters Patent are hereby corrected as shown below:

Please insert the following priority data in the above-identified patent.

Swedish Patent Appln. 4814/71, filed April 14, 1971

Signed and sealed this 18th day of February 1975.

(SEAL)
Attest:

RUTH C. MASON
Attesting Officer

C. MARSHALL DANN
Commissioner of Patents
and Trademarks